(12) United States Patent
Nakamura et al.

(10) Patent No.: US 12,105,770 B2
(45) Date of Patent: Oct. 1, 2024

(54) ESTIMATION DEVICE, ESTIMATION METHOD, AND COMPUTER PROGRAM PRODUCT

(71) Applicant: KABUSHIKI KAISHA TOSHIBA, Tokyo (JP)

(72) Inventors: Norihiro Nakamura, Kawasaki (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 882 days.

(21) Appl. No.: 17/191,771

(22) Filed: Mar. 4, 2021

(65) Prior Publication Data
US 2022/0076058 A1    Mar. 10, 2022

(30) Foreign Application Priority Data
Sep. 7, 2020 (JP) .................................. 2020-149570

(51) Int. Cl.
*G06F 18/211* (2023.01)
*G06F 18/214* (2023.01)
(Continued)

(52) U.S. Cl.
CPC .......... *G06F 18/211* (2023.01); *G06F 18/214* (2023.01); *G06F 18/251* (2023.01);
(Continued)

(58) Field of Classification Search
None
See application file for complete search history.

(56) References Cited

U.S. PATENT DOCUMENTS

| | | |
|---|---|---|
| 10,657,388 B2 | 5/2020 | Patil |
| 11,341,737 B2 * | 5/2022 | Nakamura ............. G06V 10/82 |
| 2021/0064914 A1 | 3/2021 | Nakamura et al. |

FOREIGN PATENT DOCUMENTS

| | | |
|---|---|---|
| JP | 2019-8571 A | 1/2019 |
| JP | 2019-207220 A | 12/2019 |
| JP | 2021-39426 A | 3/2021 |

OTHER PUBLICATIONS

Qi et al., "PointNet: Deep Learning on Point Sets for 3D Classification and Segmentation" CVPR, 2017, 9 pages.
(Continued)

*Primary Examiner* — Michael J Cobb
(74) *Attorney, Agent, or Firm* — Oblon, McClelland, Maier & Neustadt, L.L.P.

(57) ABSTRACT

According to an embodiment, an estimation device includes one or more processors configured to: generate, from first point cloud data, second point cloud data obtained by combining an attention point and observation points; estimate an attribute of the attention point by an attribute indicated by an estimation result label having a higher belonging probability among belonging probabilities output from an attribute estimation neural network; estimate reliability of the estimation result label by a reliability estimation neural network; and display, on a display device, first display information generated by performing rendering on an object including an attention point whose attribute is estimated by an attribute of the estimation result label whose reliability is higher than a first threshold, and generated by not performing rendering on an object including an attention point whose attribute is estimated by an attribute of the estimation result label whose reliability is the first threshold or less.

9 Claims, 8 Drawing Sheets

(51) Int. Cl.
*G06F 18/25* (2023.01)
*G06N 3/08* (2023.01)
*G06T 15/00* (2011.01)
*G01S 17/66* (2006.01)

(52) U.S. Cl.
CPC .............. *G06N 3/08* (2013.01); *G06T 15/00* (2013.01); *G01S 17/66* (2013.01); *G06T 2210/52* (2013.01)

(56) References Cited

OTHER PUBLICATIONS

Gal et al., "Dropout as a Bayesian Approximation: Representing Model Uncertainty in Deep Learning" ICML, 2016, 10 pages.
Qi et al., "PointNet++: Deep Hierarchical Feature Learning on Point Sets in a Metric Space" NIPS, arXiv:1706.02413v1 [cs.CV], Jun. 7, 2017, 14 pages.
Corbière et al., "Addressing Failure Prediction by Learning Model Confidence" NeurIPS, 2019, 12 pages.

* cited by examiner

ESTIMATION DEVICE, ESTIMATION METHOD, AND COMPUTER PROGRAM PRODUCT

CROSS-REFERENCE TO RELATED APPLICATIONS

This application is based upon and claims the benefit of priority from Japanese Patent Application No. 2020-149570, filed on Sep. 7, 2020; the entire contents of which are incorporated herein by reference.

FIELD

Embodiments described herein relate generally to an estimation device, an estimation method, and a computer program product.

BACKGROUND

Along with the ongoing aging of plant and social infrastructure, the demand for maintenance management and repairs for those is increasing, so that attempts to measure the current situations and digitally manage them have been carried out. Managing important places by images or the like has mainly been performed in such attempts. Due to the ease of understanding of a total image and the applicability to physical analysis, management in three-dimensional data has begun to be used. In particular, with the background of the reduction in weight, cost, or the like of laser range finders, the accumulation of point cloud data is in progress. In practical use of these, there is a need to edit the point cloud data to delete unnecessary data and to generate data usable in CAD based on the accumulated data. These operations, carried out manually at present, are very time-consuming work. Hence, techniques of automatically estimating what each of points represents from the location of point cloud data, its accompanying color information, or the like have been proposed. These techniques typically perform pattern learning in advance from the point cloud data and attribute information (label indicating what is represented) based on the point cloud data and each of points associated with the piece of data, and perform, at the time of estimation, observing the similarity between the pattern and the input point, and output the degree of similarity to each of attributes, for each of the attributes.

Unfortunately, however, with the conventional techniques, it has been difficult to perform display control in consideration of the possible existence of the input point. When the training data is considered as data acquired from the environment for which the possible existence is to be evaluated, and an estimated value as an output result is considered as the degree of similarity to the data at the time of learning, it would be possible to estimate whether there is a similar pattern in the training data by taking the estimated value into consideration. However, in the conventional techniques, the attribute corresponding to the maximum value is adopted as representation of the point, among the output results at the time of estimation. Therefore, in a case where erroneous estimation occurs, the similarity of completely different attribute would be observed, and with the above types of concept, it would be not possible to evaluate the possible existence. Non-Patent Document "C. Corbierel et al., Addressing Failure Prediction by Learning Model Confidence, NeurIPS 2019" proposes a method of simultaneously estimating a value indicating how reliable the estimation result is. However, the reliability of the value itself is not in consideration, with no disclosure of a means for using the value for display control.

DETAILED DESCRIPTION

According to an embodiment, an estimation device includes one or more processors. The one or more processors are configured to: acquire first point cloud data; generate, from the first point cloud data, second point cloud data obtained by combining an attention point that gains attention as an estimation target of an attribute and at least one observation point; estimate an attribute of the attention point by using an attribute indicated by an estimation result label having a higher belonging probability out of belonging probabilities output from an attribute estimation neural network, the attribute estimation neural network including an input layer to which the second point cloud data is input and an output layer that outputs the belonging probabilities for respective attributes of the attention point; estimate reliability of the estimation result label by using a reliability estimation neural network including an input layer to which an intermediate feature of the attribute estimation neural network is input and an output layer that outputs either logit of an attribute being a correct answer or an estimated value of a belonging probability; and display, on a display device, first display information generated by performing rendering on an object including an attention point whose attribute is estimated by an attribute of the estimation result label whose reliability is higher than a first threshold, and generated by not performing rendering on an object including an attention point whose attribute is estimated by an attribute of the estimation result label whose reliability is the first threshold or less.

With reference to the accompanying drawings, embodiments of an estimation device, an estimation method, and a computer program product will be described in detail.

First Embodiment

An example of a functional configuration of an estimation device 100 according to a first embodiment will be described.

Example of Functional Configuration

Figure 1:
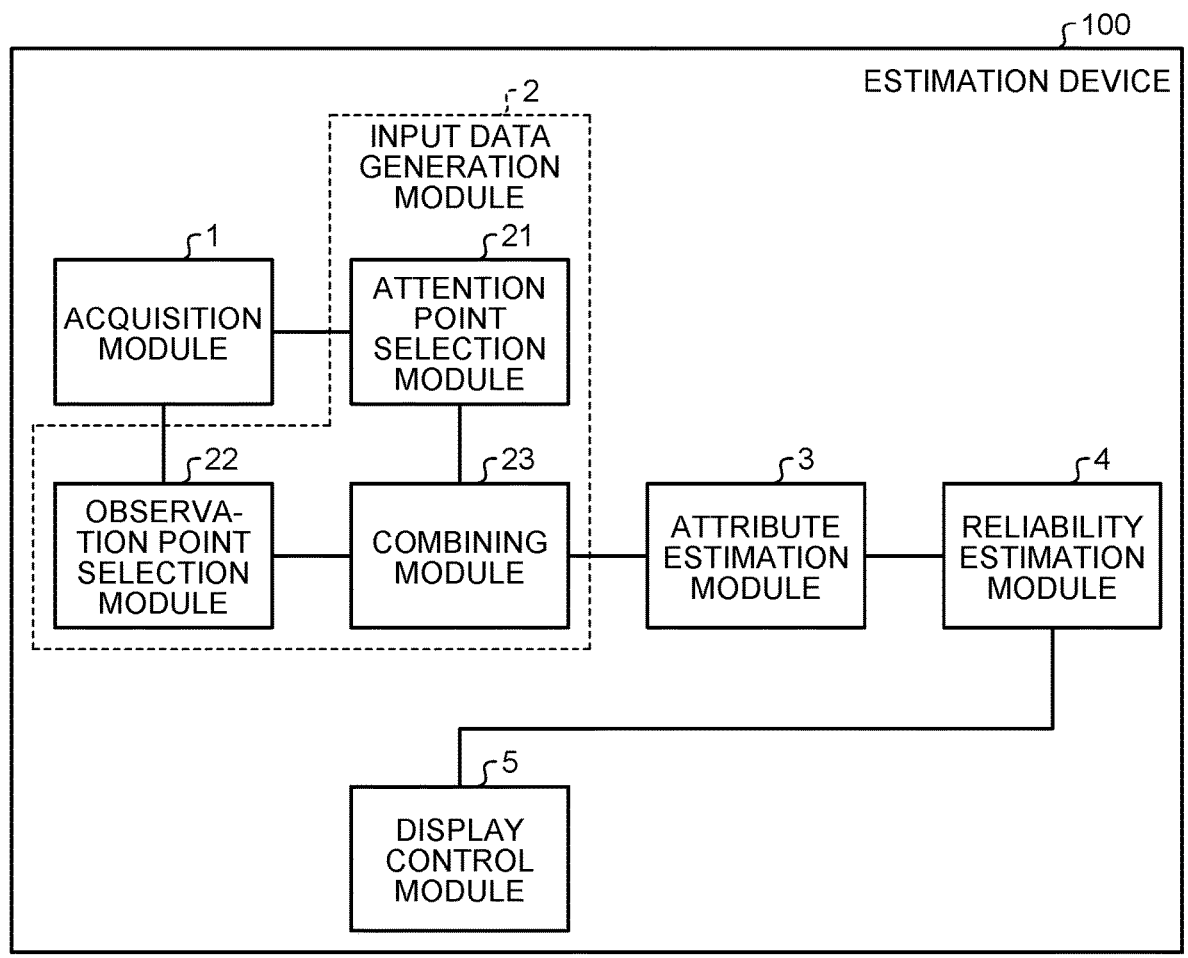
FIG. 1 is a diagram illustrating an example of a functional configuration of an estimation device according to a first embodiment.

FIG. 1 is a diagram illustrating an example of a functional configuration of the estimation device 100 of the first embodiment. The estimation device 100 of the first embodiment includes an acquisition module 1, an input data generation module 2, an attribute estimation module 3, a reliability estimation module 4, and a display control module 5. The input data generation module 2 includes an attention point selection module 21, an observation point selection module 22, and a combining module 23.

Each of functions illustrated in FIG. 1 may be implemented by a separate device. In this case, each of the devices is in a state capable of performing communication directly or indirectly via a communication network, in which each of the devices is capable of transmitting and receiving point cloud data or the like with one another. The type of the communication network is optional, and each of the devices may be in a mode capable of performing communication with one another via a local area network (LAN) installed in a building, for example. Furthermore, each device may be in a mode capable of performing communication with one another via a network (or cloud) such as the Internet, for example.

The acquisition module 1 acquires first point cloud data X to be an object of identification from an external storage device, a three-dimensional measurement device, or the like. The first point cloud data X includes at least three-dimensional position coordinates (x, y, z). The first point cloud data X may include color information (r, g, b), laser reflection intensity information i, or the like, depending on the measurement method. When there is information calculated in advance in various methods, such information may be included.

In addition, the information and acquisition source need not be limited to those described above. For example, it is conceivable to acquire information from the output of another neural network. In that case, obtained information is an intermediate feature of the neural network, and thus, it is allowable to not include the position coordinates.

Examples of the external storage device are not limited to a storage medium such as a hard disk and a CD, but include a server connected via the communication network. Examples of a three-dimensional measurement device include a laser range finder, a stereo camera, or the like. In the case of a stereo camera, a three-dimensional point can be obtained by estimating the depth of each of pixels based on an image.

The attention point selection module 21 selects an attention point Cp that gains attention as a target of attribute estimation, from the first point cloud data X acquired by the acquisition module 1. The attribute represents information that specifies what the attention point Cp represents, for example. The attention point selection module 21 selects the attention point Cp from the first point cloud data X, for example, based on a uniform distribution.

For simplifying explanation, the following describes an example in which the attention point Cp is a single point. Alternatively, the attention point selection module 21 is also capable of selecting a plurality of attention points Cp. In the case where a plurality of attention points Cp is selected, processing can be applied to each of the individual attention points Cp. It is allowable, of course, to perform batch processing by handling the points in the form of a matrix or a tensor as is performed in a typical deep learning platform.

The observation point selection module 22 randomly selects observation points s of a predetermined number m, from the first point cloud data X acquired by the acquisition module 1. In the following description, an aggregate of a plurality of selected observation points s is referred to as an observation point cloud S. The selection method of the observation point cloud S is not limited to random selection, and it would be sufficient as long as the observation point cloud S is randomly selected in accordance with a certain probability distribution (selection probability). Thus, the observation point cloud S may be selected with a selection probability other than an equal selection probability.

Based on the attention point Cp and the observation point cloud S, the combining module 23 generates second point cloud data X' as input data for estimating the attribute of the attention point Cp.

Figure 2:
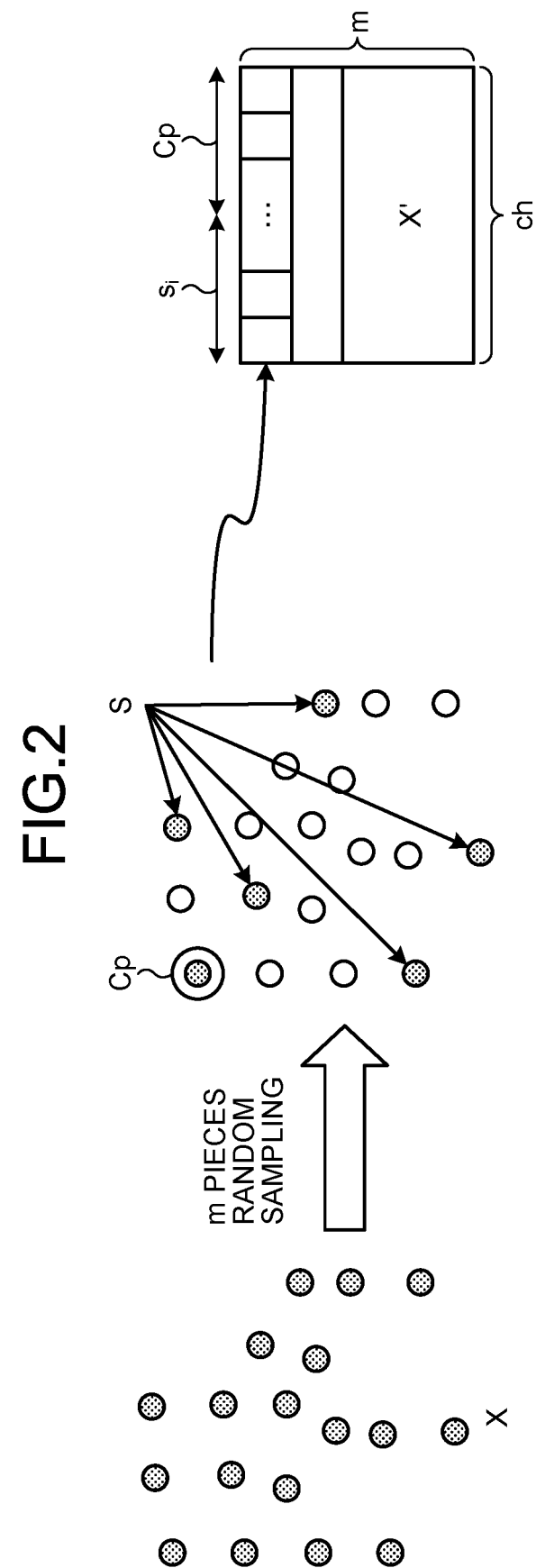
FIG. 2 is a diagram illustrating an example of second point cloud data of the first embodiment.

FIG. 2 is a diagram illustrating an example of the second point cloud data X' of the first embodiment. As illustrated in FIG. 2, the combining module 23 combines the observation point cloud S and the attention point Cp to constitute the second point cloud data X' as a single data unit. Specifically, the combining module 23 performs a process of combining a source $s_i$ of the observation point cloud S ($0 \leq i < m$; m is the number of observation points included in S) and the attention point Cp on all sources of S. In FIG. 2, ch corresponds to a dimension combined, and ch resulting from the combining has a value obtained by summing the number of elements of the observation point $s_i$, and the number of elements of the attention point Cp. The observation point $s_i$ has m types, so that vectors of m types are obtained for a single attention point Cp. Putting those vectors together in the form of a tensor forms the second point cloud data X'.

For the sake of simplicity, FIG. 2 illustrates the case of a single attention point Cp. However, in a case where n pieces of attention points Cp are selected, the second point cloud data X' would be a tensor of n×m×ch.

Furthermore, in the example of FIG. 2 above, m types of vectors are constituted by combining the source $s_i$ of the observation point cloud S and the attention point Cp. However, the vector constitution method is not limited to this. In addition to the example in FIG. 2 above, it is conceivable to introduce a combination of attention points Cp and Cp, which is a combination with itself. In this case, m+1 types of vectors are obtained. It is also conceivable to add a combination of the sources $s_i$ included in the observation point cloud S. In the former case, it is possible to explicitly take the attention point Cp into consideration, and in the latter case, it is possible to directly take the observation points $s_i$ into consideration.

Referring back to FIG. 1, the attribute estimation module 3 estimates the attribute of the attention point Cp by performing deep learning with the input of the second point cloud data X' generated by the combining module 23.

Figure 3:
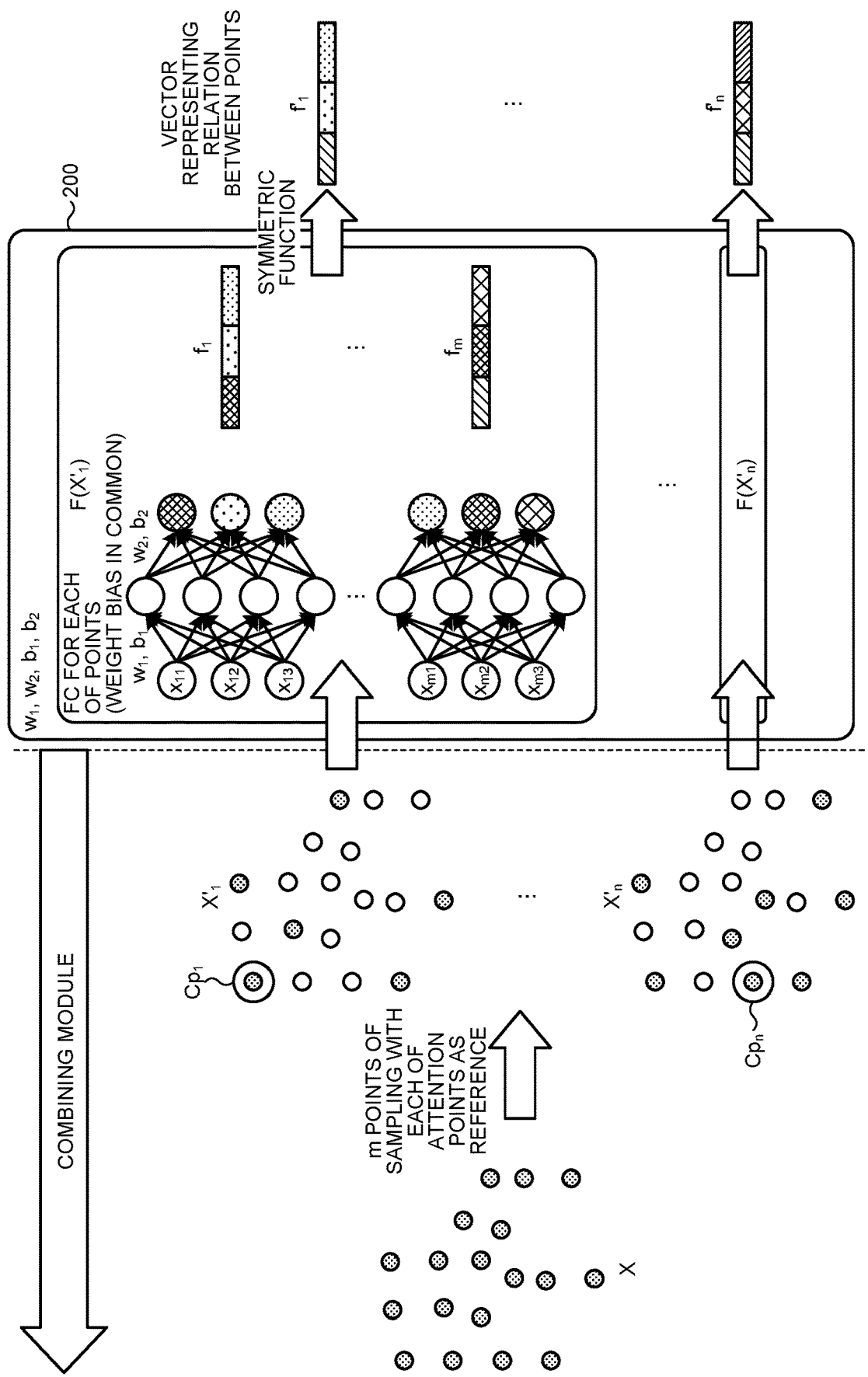
FIG. 3 is a diagram illustrating an operation example of an attribute estimation module of the first embodiment.

FIG. 3 is a diagram illustrating an operation example of the attribute estimation module 3 of the first embodiment. F (X) is a function that represents a deep learning network. As illustrated in FIG. 3, the attribute estimation module 3 inputs X'1 to X'n obtained by dividing the second point cloud data X' in an n direction, to an attribute estimation neural network 200. The attribute estimation neural network 200 is a deep neural network (DNN), for example.

The attribute estimation module 3 convolutes X'1 to X'n in the ch direction by fully connected layers of the attribute estimation neural network 200. At this time, note that the convolution is not to be executed in an m direction. This process leads to acquisition of feature vector groups f1 to fm with the same length, convoluted by fully connected layers.

The attribute estimation module 3 applies a symmetric function to the feature vector groups f1 to fm and obtains a single intermediate feature vector f' (intermediate feature) that takes the obtained feature vector groups in consideration. Specifically, the attribute estimation module 3 performs an operation of maxpooling that takes a maximum value for each of elements to perform conversion into a single vector, thereby obtaining intermediate feature vectors f1 to fn of each of the attention points $Cp_1$ to $Cp_n$, respectively. Each of these will be a logit of the attention points $Cp_1$ to $Cp_n$.

The attribute estimation module 3 converts this logit into a value that can be handled by the probability of 0 to 1 by a softmax function, as performed in general deep learning, thereby obtaining a belonging probability that represents the probability of belonging to the attribute. That is, the attribute estimation module 3 calculates a belonging probability for each of attributes by the attribute estimation neural network 200 that includes an input layer to which the second point cloud data X' is input and an output layer that outputs a belonging probability for each of attributes of the attention point Cp.

In a case where the number of elements of the intermediate feature vector f' does not match the number of attributes c, it only needs to further apply fully connected layers to the intermediate feature vector f' so as to be adjusted to vectors of the same length as the number of attributes c assumed in advance. Furthermore, it is not always necessary to adjust so as to match the number of attributes c. For example, when this f' is used as an input of various other neural networks, the number of elements may preferably be adjusted to a required length.

It is assumed that a coefficient of the convolution by deep learning is determined in advance by learning or the like. For example, the coefficient may be determined by: comparing the belonging probability that is ultimately output in a procedure similar to that of the first embodiment with a true value; and repeating the operation of adjusting the coefficient in accordance with the deviation. Other than that, the coefficient may be determined by using various methods performed in learning coefficients in the field of deep learning.

Although maxpooling has been used as the symmetric function in the above, there is no need to limit it to this. It is allowable to use any symmetric function as long as its calculation result is not affected by the order of the feature vector groups f1 to fm. It is possible to replace maxpooling with a sum of each element, an average, or the like, for example. Moreover, the intermediate feature vector f' may be pre-calculated information in the first point cloud data X. In this case, it is sufficient to perform the above-described processing in a state where the intermediate feature vector f' is appended to each of points of the first point cloud data X.

The reliability estimation module 4 receives an input of the intermediate feature vector f' obtained during the attribute estimation process by the attribute estimation module 3, and applies a deep learning network G (f') different from the attribute estimation neural network 200, as a reliability estimation neural network. The reliability estimation module 4 estimates, by using y'=G (f'), a logit of the attribute that is the correct answer or a value y indicating the belonging probability, from among the logits obtained by the attribute estimation module 3 or the belonging probabilities for individual attributes obtained as a result of application of the softmax function to the logit.

The belonging probability of the attribute that is the correct answer increases as the data input to the attribute estimation neural network 200 resembles the training data used for learning of the attribute estimation neural network 200. On the other hand, when the data input to the attribute estimation neural network 200 is not related to the training data used for learning the attribute estimation neural network 200, the belonging probability having the maximum value, the belonging probability being output by the attribute estimation neural network 200, does not always correspond to the belonging probability of the correct answer attribute (a case where the estimation result is incorrect).

The learning of the deep learning network G is performed so that the logit of the attribute that is the correct answer, or the value y indicating the belonging probability, is close to the estimated value y'=G (f') as much as possible. Therefore, it is not possible to determine which attribute is the correct answer from the output of network G, but still it is considered to be possible to output a value close to the probability that is supposed to be output by the attribute estimation neural network 200 with respect to the attribute that is the correct answer. Accordingly, the higher the estimated value y'=G (f'), the higher the accuracy of the estimation result obtained as the attribute corresponding to the maximum value of the belonging probability output by the attribute estimation neural network 200. That is, the estimated value y'=G (f') indicates the reliability of an estimation result label obtained by the attribute estimation neural network 200.

The method of estimating the value y indicating the belonging probability of the attribute being a correct answer by using G is not limited to this, and various variations are conceivable. For example, it is allowable to use a method in which 0.0 to 1.0 is divided in advance in an arbitrary step (range) to which serial numbers are assigned, and the serial number including the value y is estimated by G. This makes it possible to simplify the problem rather than using direct regression on the consecutive values y. In addition, it is also allowable to use G(X, f, f'), for example, to input a plurality of pieces of data input to a deep learning network F (attribute estimation neural network 200) and various intermediate results calculated inside the network, and estimate.

The display control module 5 performs display control of the display information by using the estimation results of the attribute estimation module 3 and the reliability estimation module 4, individually. Specifically, the display control module 5 excludes points whose reliability y' obtained from the reliability estimation module 4 is a threshold or less, from the target at the time of rendering. That is, the display control module 5 includes only the points whose reliability is higher than a threshold, that is, the points where the training data is more likely to contain similar patterns, in a display image that undergoes rendering. The threshold with the highest certainty is considered to be 0.5 from the viewpoint that the reliability y' is a probability value. However, a value smaller than 0.5 may be set as a threshold in consideration of generalization performance by learning.

Next, an example of an estimation method of the first embodiment will be described.

Example of Estimation Method

Figure 4:
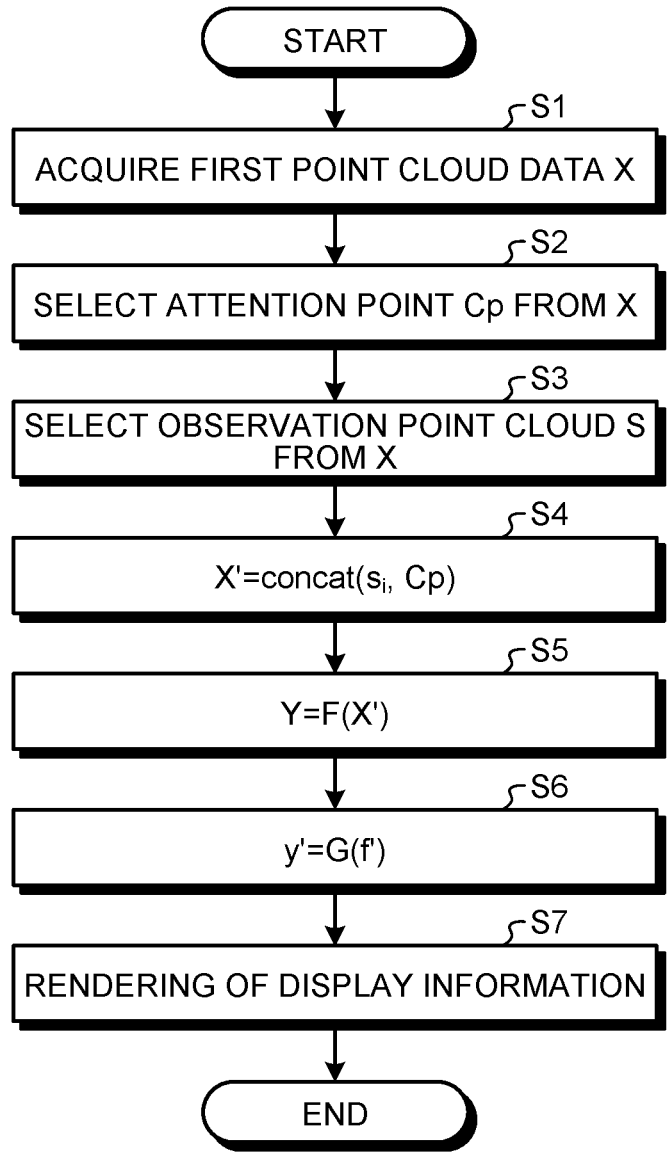
FIG. 4 is a flowchart illustrating an example of an estimation method of the first embodiment.

FIG. 4 is a flowchart illustrating an example of an estimation method of the first embodiment. First, the acquisition module 1 acquires first point cloud data from an external storage device, a three-dimensional measurement device, or the like (step S1). Next, the attention point selection module 21 selects, from the first point cloud data X acquired by the processing at step S1, the attention point Cp that gains attention as a target of attribute estimation (step S2).

Next, the observation point selection module 22 selects, from the first point cloud data X acquired by the processing at step S1, the observation point cloud S including m pieces of observation points $s_i$ (0≤i<m) (step S3).

Next, the combining module 23 generates, from the attention point Cp and the observation point cloud S, the second point cloud data X' as the input data for estimating the attribute of the attention point Cp (step S4). Concat generates a vector that is obtained by combining the coordinate components of the observation point $s_i$ and the coordinate components of the attention point Cp. The second point cloud data X' is represented by the tensor including an array of the components of the generated vector (refer to FIG. 2).

Next, the attribute estimation module 3 inputs the second point cloud data X' to the attribute estimation neural network 200 (F (X')) and obtains an output Y=(y_1, y_2, . . . , y_c) (step S5). Each of components $y_j$ of the output Y (1≤j≤c; c is the number of attributes) is a value in the range of 0 to 1 indicating the belonging probability of the attribute indicated by a jth component, for example. Of each of the components $y_j$, the attribute indicated by an estimation result label corresponding to the component y having a higher value (for example, the maximum value) indicates an estimation result estimated by the attribute estimation neural network 200.

Next, the reliability estimation module 4 receives an input of the intermediate feature vector f' obtained in the attribute estimation process in step S5, and estimates the reliability of the estimation result label obtained by the attribute estimation neural network 200, by using the estimated value y'=G(f') of the logit of the attribute that is the correct answer or the value y indicating the belonging probability (step S6).

Next, the display control module 5 performs rendering on the display information to be displayed on a display device (step S7). Specifically, the display control module 5 performs rendering on an object including the attention point Cp whose attribute is estimated by the attribute of the estimation result label whose reliability y' is higher than the threshold. In contrast, the display control module 5 does not perform rendering on an object including the attention point Cp whose attribute is estimated by the attribute of the estimation result label whose reliability y' is the threshold or less.

As described above, in the estimation device 100 of the first embodiment, the acquisition module 1 acquires the first point cloud data X. The input data generation module 2 generates, from the first point cloud data X, the second point cloud data X' in which the attention point Cp that gains attention as a target of attribute estimation and at least one observation point s are combined. The attribute estimation module 3 estimates the attribute of the attention point Cp by the attribute indicated by the estimation result label in which the belonging probability is higher, from among the belonging probabilities output from the attribute estimation neural network 200 (deep learning network F) that includes an input layer to which the second point cloud data X' is input and an output layer that outputs the belonging probability for each of the attributes of the attention point Cp. Using the reliability estimation neural network (deep learning network G) including the input layer to which the intermediate feature (intermediate feature vector f') of the attribute estimation neural network 200 is input and the output layer that outputs the logit of the attribute that is the correct answer or the estimated value y' of the belonging probability, the reliability estimation module 4 estimates the reliability y' of the estimation result label of the attribute estimation neural network 200. The display control module 5 displays, on the display device, display information generated by performing rendering on the object including the attention point Cp whose attribute is estimated by the attribute of the estimation result label whose reliability y' is higher than the threshold, and generated by not performing rendering on the object including the attention point Cp whose attribute is estimated by the attribute of the estimation result label whose reliability y' is the threshold or less.

According to the estimation device 100 of the first embodiment, the display control can be performed in consideration of the possible existence of the input point (first point cloud data X). Specifically, visibility/non-visibility (display/non-display) can be controlled in consideration of the possible existence such as whether the point constantly exists in a predetermined environment. For example, an object that exists only temporarily (object not existing in the training data of the attribute estimation neural network 200) such as a scaffolding under construction can be set to hidden (non-display), enabling the user to work with higher efficiency at the time of selectively confirming (editing) the points indicating target shapes.

First Modification of First Embodiment

Next, a first modification of the first embodiment will be described. In the description of the first modification, the description different from the first embodiment will be described, omitting portions similar to that of the first embodiment.

In the first modification, a case where the attribute estimation module 3 estimates an attribute by a method assuming a graph will be described.

The attribute estimation module 3 estimates the attribute of the attention point Cp by deep learning using the tensor (second point cloud data X') constituted by the combining module 23, the observation point cloud S, and the attention point Cp, as inputs. When F (X) is a function expressing the deep learning network F, using X'1 to X'n obtained by dividing the second point cloud data X' in the n direction as input, convolution is performed in the ch direction by the fully connected layers, thereby estimating a mixing ratio φ1 to φn. At this time, note that the convolution is not to be executed in an m direction.

Next, a feature vector f is obtained by $f_i=\Sigma_n \phi_i s_i$ using this ratio and the observation point cloud S. In this case, since the symmetric function has already been applied, the feature vector f obtained is one intermediate feature vector f' (logit of the attention point Cp) in consideration of the feature vector group including the obtained feature vector f. The attribute estimation module 3 converts this logit into a value that can be handled by the probability of 0 to 1 by a softmax function, as performed in general deep learning, thereby obtaining a belonging probability of each of the attributes.

When the number of elements of f' does not match the number of attributes c, it only needs to further apply fully connected layers to f' and adjust f' to vectors of the same length as the number of attributes c assumed in advance.

In the above example, $f_i$ is determined as a weighted sum of the observation point cloud S alone, but the determination method is not limited to this. For example, as described above, when a combination of Cp is added when constituting the tensor (second point cloud data X'), it is also conceivable to use the sum of $\phi_j C_p$ (j is a subscript corresponding to the combination of Cp).

Furthermore, a constraint may be added so as to satisfy $\Sigma_n \phi_i = 1.0$. In this case, for example, softmax function may be applied to the obtained mixing ratio ϕ. Furthermore, for example, it is also allowable to calculate $\phi_k'=\phi_k/\Sigma_n\phi_i$ and use the obtained $\phi_k'$ as the mixing ratio.

Furthermore, it is allowable to add a condition that minimizes $L=\|1.0-\Sigma_n\phi_i\|$ at the time of learning so as to bring $\Sigma_n\phi_i$ closer to 1.0 as much as possible. In this case, the total $\Sigma_n\phi_i$ does not necessarily become 1.0, but still it is considered to be able to facilitate learning in the sense that the conditions can be relaxed as needed from the viewpoint of the network.

Furthermore, Cp and the calculated f' vector may be combined in the direction of the element to form a new f'. In this case, a new f' is calculated by further applying the fully connected layers in consideration of both vectors. This would allow a clearer consideration of Cp alone and Cp in other respects.

Furthermore, although ϕ is treated as a scalar in the above example, ϕ may be a vector. In this case, ϕ obtained by the first convolution may have the similar number of elements as $s_i$ and Cp, and the product of each of elements may be obtained. Furthermore, the similar constraint conditions as those for the scalar described above may be applied for each of elements.

It is assumed that a coefficient of the convolution by deep learning is determined in advance by learning or the like. For example, the coefficient may be determined by: comparing the probability that is ultimately output in the procedure similar to that of the present modification with a true value; and repeating the operation of adjusting the coefficient in accordance with the deviation. Other than that, the coefficient may be determined by using various methods performed in learning coefficients in the field of deep learning.

Second Modification of First Embodiment

Next, a second modification of the first embodiment will be described. In the description of the second modification, the description different from the first embodiment will be described, omitting portions similar to that of the first embodiment.

The second modification will describe a case where the deep learning network F (attribute estimation neural network 200) has an attention structure that generates a filter to be applied to the intermediate feature vector f in order to obtain a better intermediate feature vector f'.

By performing convolution with the fully connected layers of the attribute estimation neural network 200 on the attention point Cp, the attribute estimation module 3 of the second modification obtains a filter g that acts on the intermediate feature vector f'. The filter g is applied to the intermediate feature vector f' by using an element product of the element of the intermediate feature vector f' and the element of g. The application method of the filter g need not be the product of elements, and may be a method of obtaining an element-wise sum or a method of combining f' and g.

Furthermore, when there is a plurality of attention points Cp, it is possible to consider the features in the vicinity by using the method described in Non-Patent Document "C. R. Qi et al., Pointnet++: Deep hierarchical feature learning on point sets in a metric space, NIPS, 2017", for example. This makes it possible to explicitly take the attention point Cp and information regarding its vicinity into consideration.

Third Modification of First Embodiment

Next, a third modification of the first embodiment will be described. In the description of the third modification, the description different from the first embodiment will be described, omitting portions similar to that of the first embodiment.

In the third modification, noise different from the noise at the time of parameter decision is injected into the network, and the change in the output at that time is observed to estimate whether a similar pattern exists in the training data with respect to the attention point Cp.

The reliability estimation module 4 of the third modification samples at d+η points when generating the second point cloud data X' by random sample, and uses a temperature parameter T when calculating the softmax. That is, the reliability estimation module 4 uses the deep learning network F instead of the deep learning network G at the time of estimation. The softmax function of the deep learning network F used by the reliability estimation module 4 is transformed into the following Formula (1).

$$u_g = \frac{e^{(l_g/T)}}{\sum_i e^{(l_i/T)}} \quad (1)$$

In a case where the output of the deep learning network F (the belonging probability of the estimation result label output by the attribute estimation neural network 200) is greater than the threshold, the reliability estimation module 4 estimates that a similar pattern existed at the attention point Cp at the time of learning. In contrast, in a case where the output of the deep learning network F is the threshold or below, the reliability estimation module 4 estimates that the attention point Cp is a point representing an (unsteady) object with no existence of a similar pattern at the time of learning.

Second Embodiment

Next, a second embodiment will be described. In the description of the second embodiment, the description different from the first embodiment will be described, omitting portions similar to that of the first embodiment.

The above-described first embodiment has described the method of considering the entire shape at practical processing cost by resampling and approximating the shape. The second embodiment is different from the first embodiment in that the entire shape is more accurately considered by taking the information lost by resampling into statistic consideration.

Example of Functional Configuration

Figure 5:
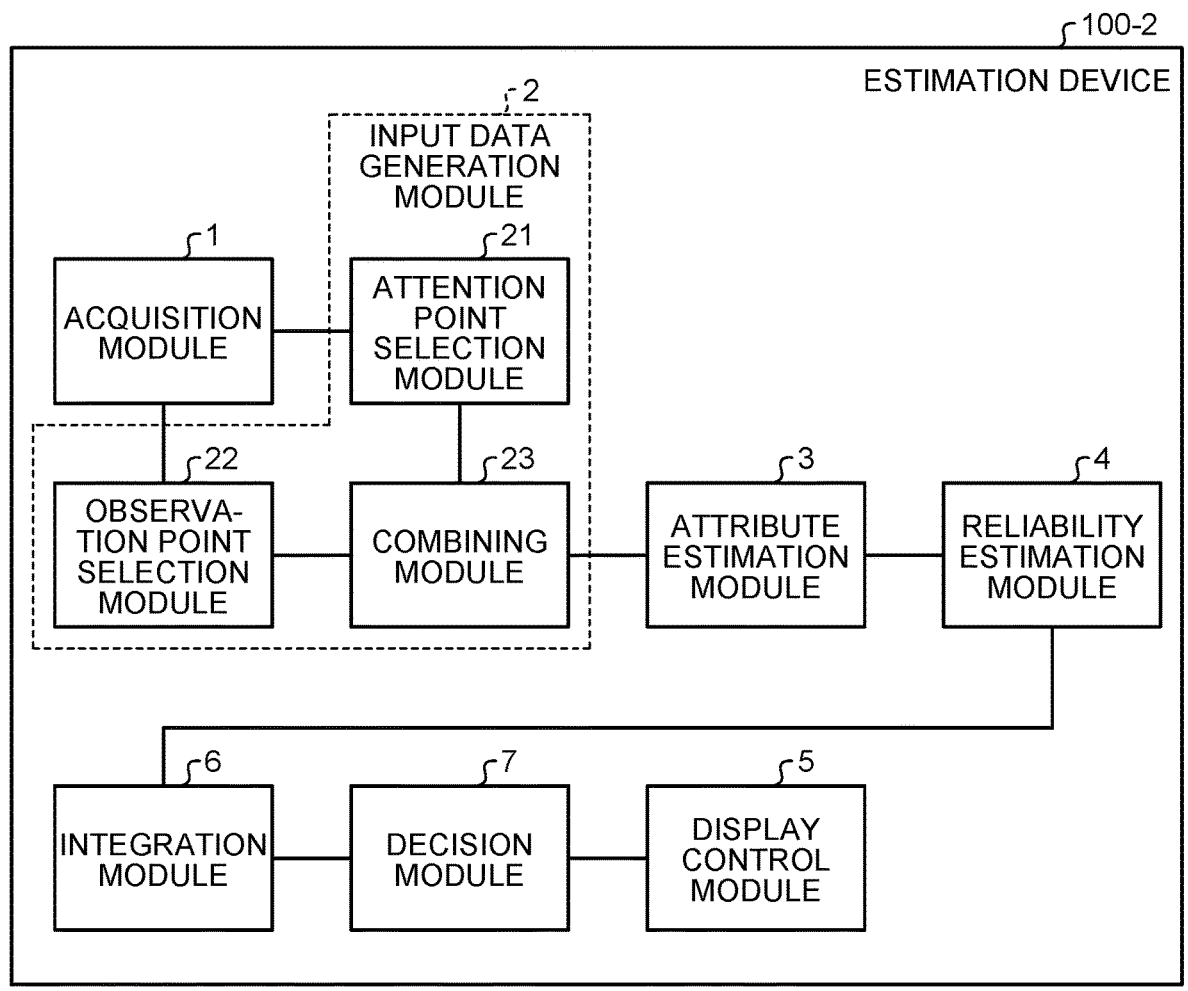
FIG. 5 is a diagram illustrating an example of a functional configuration of an estimation device according to a second embodiment.

FIG. 5 is a diagram illustrating an example of the functional configuration of an estimation device 100-2 of the second embodiment. The estimation device 100-2 of the second embodiment includes an acquisition module 1, an input data generation module 2, an attribute estimation module 3, a reliability estimation module 4, a display control module 5, an integration module 6, and a decision module 7. The input data generation module 2 includes an attention point selection module 21, an observation point selection module 22, and a combining module 23.

In the second embodiment, the integration module 6 and the decision module 7 have been added. The following describes the processing differing from that of the first embodiment.

The observation point selection module 22, the combining module 23, and the attribute estimation module 3 of the second embodiment are different from those of the first embodiment in that they repeat the above-described processing of step S3 to step S6 a predetermined number of times LimN. Therefore, the output of the attribute estimation module 3 in the second embodiment is c-dimensional LimN pieces of vectors.

This can be considered equivalent to performing Bayesian inference of the predictive distribution of the output y when a new point x is input. In addition, replacing the dropout in Non-Patent Document "Y. Gal et al., Dropout as a Bayesian Approximation: Representing Model Uncertainty in Deep Learning, ICML, 2016", with the fact that the point included in X is not considered can derive a similar conclusion.

The following explains that the processing of repeating the above-described step S3 to step S5 is equivalent to performing Bayesian inference of the predictive distribution of the output y when a new point x is input.

During a time when N pieces of input data X and output Y are observed, in a case where new data x^(x^(x hat) represents a symbol in which ^ is over x) is given, the distribution of the prediction value y^(y^(y hat) represents a symbol in which ^ is over y) is expressed by the following Formula (2).

$$p(\hat{y}|\hat{x},X,Y)=\int p(\hat{y}|w,\hat{x})p(w|X,Y)dw \qquad (2)$$

Since it is difficult to directly obtain p(w|X, Y), by defining a function $q_\theta(w)$ having a parameter θ instead, approximation is performed by minimizing the distance between them, as in the following Formula (3).

$$KL(q_\theta(w)|p(w|X,Y)=\log p(Y|X)-\int q_\theta(w)\log p(Y|X)dw + KL(q_\theta(w)|p(w)) \qquad (3)$$

Rearranging the constant term and defining VI(θ) as in the following Formula (4) leads to the following Formula (5).

$$VI(\theta)=-\int q_\theta(w)\log p(Y|x)dw + KL(q_\theta(w)|p(w)) \qquad (4)$$

$$\min_\theta KL(q_\theta(w)\mid p(w\mid X,Y)) = \min_\theta VI(\theta) \qquad (5)$$

By assuming that X and Y are independent and that M pieces of VI out of all data are sampled, and replacing $q_\theta(w)$ with a distribution $p(\gamma)$ not having the parameter θ, the following Formula (6) is obtained.

$$\hat{VI} = -\frac{N}{M}\sum_i \int p(\gamma)\log p(y_i \mid \xi^{g(\theta,\gamma)}(x_i))d\gamma + KL(q_\theta(w)\mid p(w)) \qquad (6)$$

Approximation on the integral portion of the above Formula (6) by the Monte Carlo method leads to the following Formula (7).

$$\hat{VI} = -\frac{N}{M}\sum_i \log p(y_i \mid \xi^{g(\theta,\gamma)}(x_i)) + KL(q_\theta(w)\mid p(w)) \qquad (7)$$

Here, defining the observation points as all points of the input point cloud (first point cloud data X) and considering a typical "fully connected" (FC) pattern, the following Formula (8) is obtained. Note that σ denotes an activation function.

$$f_i=\sigma(x_iW+b), 0\le i\le n, x\in R^d, W\in R^{d\times m} \qquad (8)$$

Moreover, considering the symmetric function portion, the following Formula (9) is obtained.

$$F(X)=\max \text{pool}(T), T=[f_0 \ldots f_n] \qquad (9)$$

In practice, the observation points are selected in accordance with a certain probability, leading to the following Formula (10).

$$F(x_i)=\max \text{pool}(T \cdot Z) \qquad (10)$$

Z is a tensor in which f other than those corresponding to the point selected as the observation point is 0, and it is equivalent to the above-described observation point selection by the attribute estimation module 3 of the second embodiment. Moreover, when ReLU is selected as the activation function σ, it is expressed by the following Formula (11), leading to the following Formula (12). The inside of the curly brackets in Formula (12) represents a parameter used by the function. Furthermore, z in Formula (12) is a rewrite of the observation point selection portion of Formula (10) for the individual point x, and indicates 1 when selected and 0 otherwise.

$$\hat{f}_i = \sigma(x_iW + b)\circ z \qquad (11)$$
$$= \sigma((x_i \circ z)W + b \circ z)$$
$$= \sigma(x_i \text{diag}(z)W + b \circ z)$$

$$f'=\xi^{\{diag(z)W, b\cdot z\}}(x) \qquad (12)$$

When assuming that g(θ, y) is a function to make the parameter in the curly brackets of the above-described Formula (12), learning W and b to achieve matching between f' and y is equivalent to learning the parameter that minimizes the above-described VI hat.

Furthermore, the reliability estimation module 4 repeats the reliability estimation process of step S6 in a similar manner in conjunction with the processes of step S3 to step S5 repeated by the attribute estimation module 3. The processing of the reliability estimation module 4 of the second embodiment is also equivalent to performing Bayesian inference similarly to the above description of the processing of the attribute estimation module 3.

Next, an operation of the integration module 6 and the decision module 7 will be described.

Based on the belonging probability calculated for each of pieces of the second point cloud data X', the integration module 6 calculates integration probability for each of attributes. For example, the integration module 6 averages c-dimensional vectors of LimN pieces obtained from the attribute estimation module 3, and thereby obtains the integration probability expressed by the c-dimensional vector. That is, the integration probability is an average of a plurality of belonging probabilities Y calculated for each of pieces of the second point cloud data X' generated a predetermined number of times.

In addition, the integration module 6 calculates the integration reliability based on the LimN pieces of reliability y' obtained by the reliability estimation module 4. For example, the integration module 6 calculates the integration reliability by averaging the LimN pieces of reliability y' obtained by the reliability estimation module 4.

The decision module 7 determines the attribute having greater integration probability as the attribute of the attention point. For example, the decision module 7 decides, as the attribute of the attention point Cp, an attribute corresponding to an element having a maximum value out of the individual elements (components) of the c-dimensional vector obtained from the integration module 6. Furthermore, the decision module 7 decides whether to perform rendering of the object including the attention point Cp based on the integration reliability. For example, the decision module 7 decides to perform rendering of the object including the attention point Cp in a case where the integration reliability of the attention point Cp is greater than a threshold, and decides not to perform rendering on the object including the attention point Cp in a case where the integration reliability is the threshold or less.

Next, an example of an estimation method of the second embodiment will be described.

Example of Estimation Method

Figure 6:
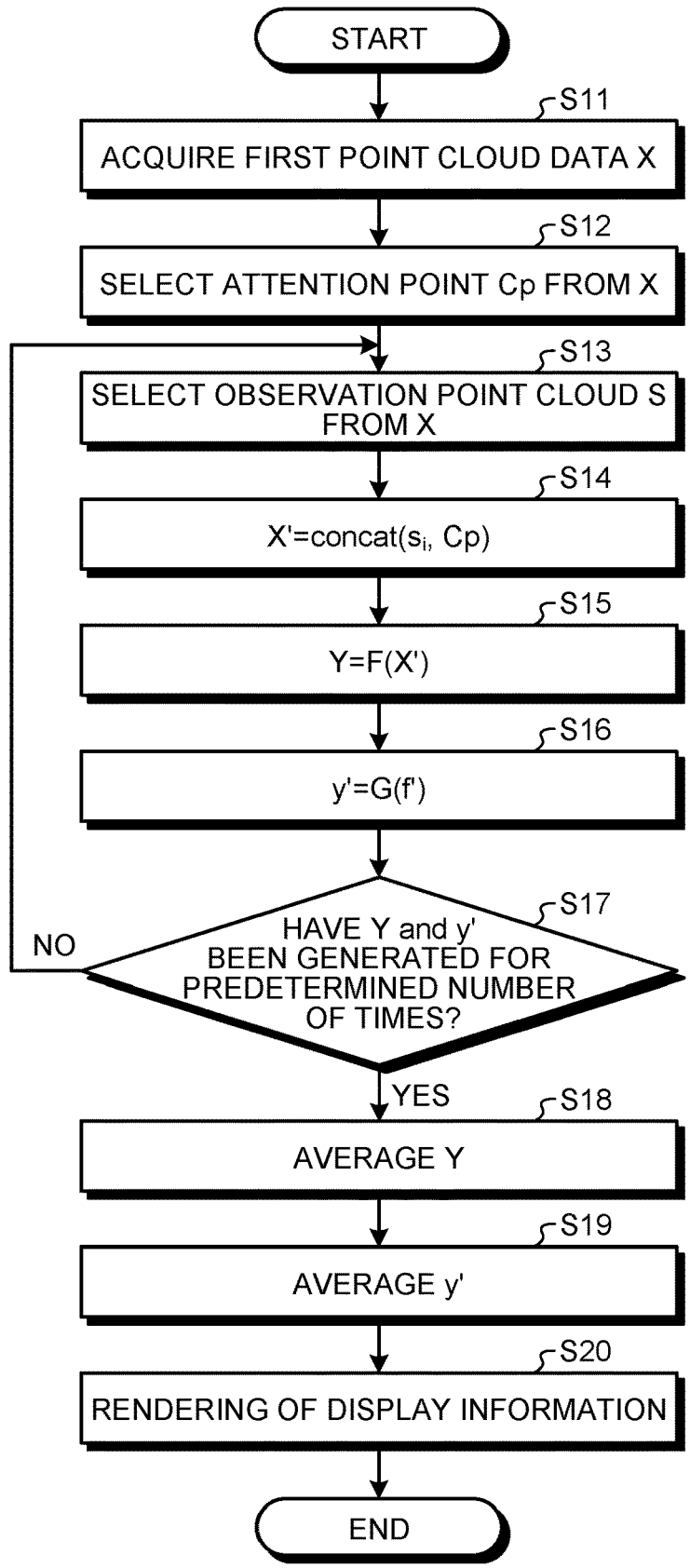
FIG. 6 is a flowchart illustrating an example of an estimation method of the second embodiment.

FIG. 6 is a flowchart illustrating an example of the estimation method of the second embodiment. The processing in step S11 to step S16 is the same as the processing in step S1 to step S6 of the first embodiment, respectively, and thus the description is omitted.

The integration module 6 determines whether the belonging probability Y and the reliability y' (or the second point cloud data X') have been generated a predetermined number of times (LimN times) (step S17). In a case where the belonging probability Y and the reliability y' have not been generated the predetermined number of times (step S16, NO), the procedure returns to the processing of step S13.

In a case where the belonging probability Y and the reliability y' have been generated the predetermined number of times (step S17, Yes), the integration module 6 calculates the integration probability by averaging LimN pieces of belonging probability Y (step S18). Next, the integration module 6 calculates the integration reliability by averaging the LimN pieces of reliability y' (step S19).

Next, the display control module 5 performs rendering on the display information to be displayed on a display device (step S20). Specifically, the attribute of the attention point Cp that undergoes rendering by the display control module 5 is decided by the decision module 7. The decision module 7 decides whether to perform rendering on the object including the attention point Cp (visibility/non-visibility of the object including the attention point Cp) based on the integration reliability obtained by the process of step S19.

As described above, in the estimation device 100-2 of the second embodiment, a shape is randomly sampled as the observation point cloud S at the time of recognition of the attribute of the attention point Cp, and the filter g is applied together with the attention point Cp. This application leads to acquisition of the belonging probability of the attribute indicated by the estimation result label output from the deep learning network F (attribute estimation neural network 200). The intermediate feature vector f' of this deep learning network F is extracted and input to a different deep learning network G (reliability estimation neural network), leading to the regression of the above-described belonging probability. Random sampling of inferences by these two networks is repeated a plurality of times (structure similar to the Monte Carlo method) with integration of the outputs will lead to acquisition of the recognition result obtained from approximation of the case where the filter g is applied to the entire shape, and acquisition of the belonging probability and variance of the attribute indicated by the estimation result label.

According to the estimation device 100-2 of the second embodiment, in estimating the attribute of the attention point Cp and displaying the display information indicating attributes, it is possible to control visibility/non-visibility of the object while considering the entire shape of the first point cloud data X in more detail by using a statistical framework.

Third Embodiment

Next, a third embodiment will be described. In the description of the third embodiment, the description different from the second embodiment will be described, omitting portions similar to that of the second embodiment.

The second embodiment has described the method of considering the entire shape in more detail by using a statistical framework. The third embodiment will describe a case where an intuitive visibility/non-visibility control method is provided by further consideration of user input.

Example of Functional Configuration

Figure 7:
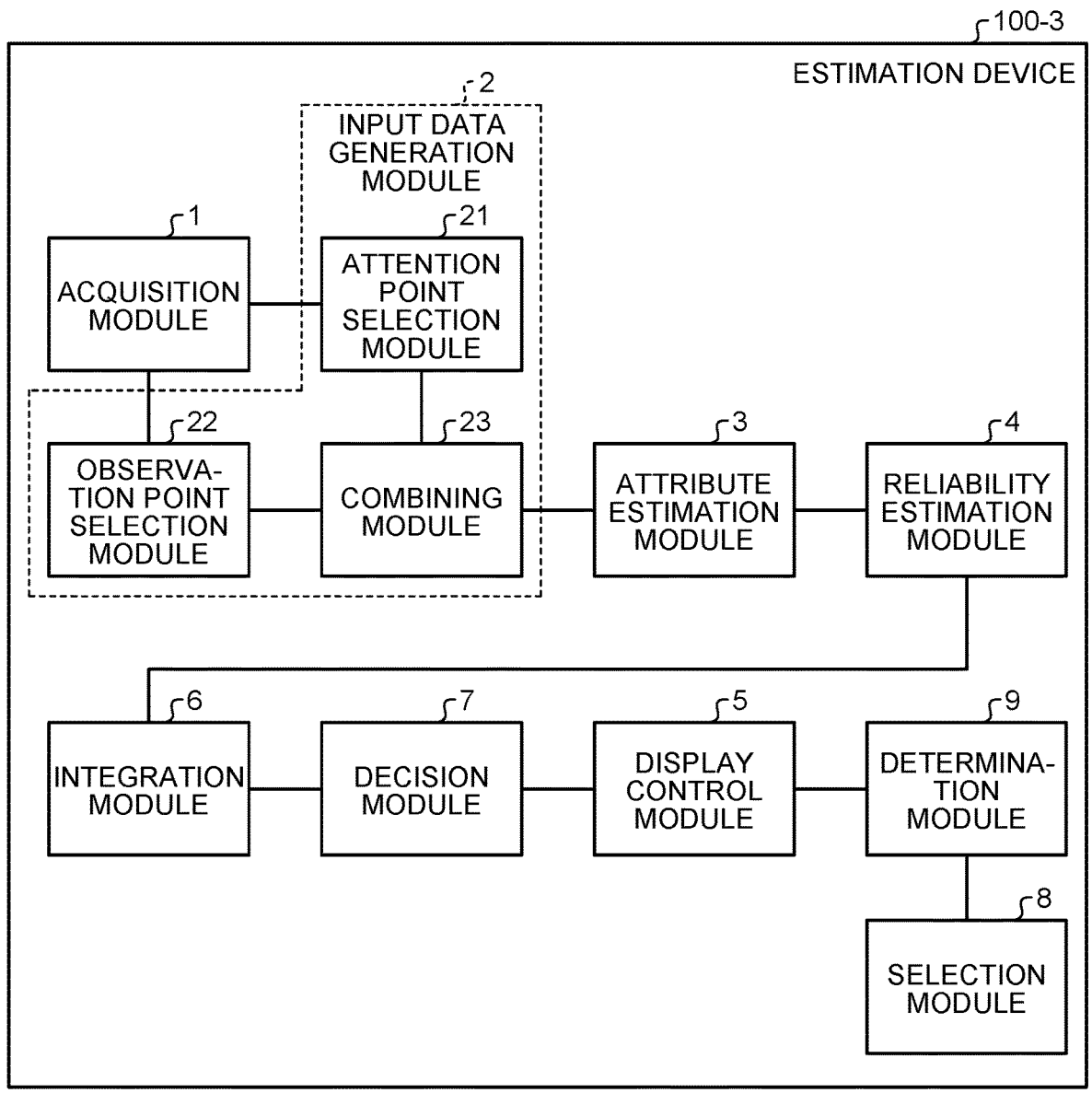
FIG. 7 is a diagram illustrating an example of a functional configuration of an estimation device according to a third embodiment.

FIG. 7 is a diagram illustrating an example of the functional configuration of an estimation device 100-3 of the third embodiment. The estimation device 100-3 of the third embodiment includes an acquisition module 1, an input data generation module 2, an attribute estimation module 3, a reliability estimation module 4, a display control module 5, an integration module 6, a decision module 7, a non-display point selection module 8, and a determination module 9. The input data generation module 2 includes an attention point selection module 21, an observation point selection module 22, and a combining module 23.

In the third embodiment, the non-display point selection module 8 and the determination module 9 have been added. The following describes the processing differing from that of the second embodiment.

The non-display point selection module 8 receives selection of a point to be removed (point to be hidden, or not displayed) from the display information displayed on the display device by the display control module 5. For example, the non-display point selection module 8 receives a point indicating an unsteady object included in the display information from the user as a point to be removed. The non-display point selection module 8 is realized by an input device such as a mouse and a touch pen that directly selects a point to be selected on the display information, for example.

The determination module 9 determines the points to be removed based on reliability $y_{in}'$ of the points selected by the non-display point selection module 8. For example, the determination module 9 determines a point having a reliability y' where the difference from the reliability $y_{in}'$ of the point selected by the non-display point selection module 8 is smaller than a threshold. Subsequently, the display control module 5 updates display information to be displayed on the display device to display information generated with no rendering performed on an object including the points selected by the non-display point selection module 8 and an object including the points determined by the determination module 9.

The point selected by the non-display point selection module 8 may be a point other than the attention point Cp, which is the estimation target of the attribute. In a case where a point other than the attention point Cp is selected, the reliability $y_{in}'$ of the selected point may be, for example, obtained by interpolation using the reliability y' of the attention point Cp in vicinity of the selected point, or using the reliability y' in the most vicinity.

Furthermore, in the second and third embodiments, when estimating the reliability y', it is possible to obtain a variance that can be considered as the uncertainty of the estimation.

Therefore, the determination module 9 may determine the range of the reliability y' by using the variance or the deviation σ that can be calculated from the variance. For example, the determination module 9 extracts points having a reliability y' included in the range of $y_{in}'-\sigma \leq y' \leq y_{in}'+\sigma$ and removes them from the target points of rendering.

Note that the range of reliability y' need not use the above conditions. For example, instead of adding or subtracting σ, adjustment may be performed by adding or subtracting λσ obtained by multiplying σ by a constant λ, or it is also allowable to add or subtract a constant value. Furthermore, it is also allowable to add or subtract the value adjusted in accordance with the input of the user. That is, it is possible to use various methods for defining a certain range centered on $y_{in}'$.

Lastly, an example of a hardware configuration of the estimation devices 100 to 100-3 according to the first to third embodiments will be described.

Example of Hardware Configuration

Figure 8:
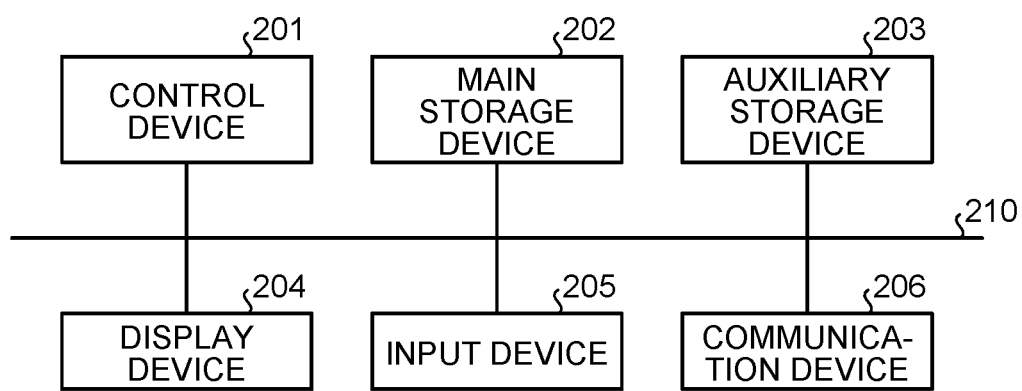
FIG. 8 is a diagram illustrating an example of a hardware configuration of the estimation device according to the first to third embodiments.

FIG. 8 is a diagram illustrating an example of a hardware configuration of the estimation devices 100 (100-2, 100-3) of the first to third embodiments.

Each of the estimation device 100 (100-2, 100-3) of the first to third embodiments includes a control device 201, a main storage device 202, an auxiliary storage device 203, a display device 204, an input device 205, and a communication device 206. The control device 201, the main storage device 202, the auxiliary storage device 203, the display device 204, the input device 205, and the communication device 206 are connected via a bus 210.

The control device 201 executes a computer program that is loaded from the auxiliary storage device 203 to the main storage device 202. The main storage device 202 includes memory such as ROM, RAM, or the like. The auxiliary storage device 203 includes a hard disk drive (HDD), a memory card, or the like.

The display device 204 displays display information. The display device 204 is, for example, a liquid crystal display or the like. The input device 205 is an interface for operating the estimation device 100 (100-2, 100-3). The input device 205 is, for example, a keyboard, a mouse, or the like. When the estimation device 100 (100-2, 100-3) is a smart device such as a smartphone and a tablet device, the display device 204 and the input device 205 are a touch panel, for example.

The communication device 206 is an interface for performing communication with an external storage device, a three-dimensional measurement device, or the like.

The computer program executed in the estimation devices 100 (100-2, 100-3) of the first to third embodiments is recorded in a computer-readable recording medium such as a CD-ROM, a memory card, a CD-R, and a DVD in a file of an installable format or an executable format and provided as a computer program product.

Furthermore, the computer program executed by the estimation device 100 (100-2, 100-3) of the first to third embodiments may be stored in a computer connected to a network such as the Internet, and be provided by downloading via the network. The computer program executed by the estimation device 100 (100-2, 100-3) of the first to third embodiments may be provided via a network such as the Internet, rather than being downloaded.

The computer program of the estimation device 100 (100-2, 100-3) of the first to third embodiments may be provided by programing in a device such as ROM in advance.

The computer program of the estimation device 100 (100-2, 100-3) of the first to third embodiments is in a modular configuration including functional blocks that can be implemented by the computer program, out of the above-described functional blocks (FIGS. 1, 5, and 7), Regarding each of the relevant functional blocks, the control device 201 as the actual hardware reads out the computer program from a recording medium and executes the program, thereby loading each of the above-described functional blocks on the main storage device 202. That is, the above-described various functional blocks are generated on the main storage device 202.

Part of or a whole of the above-described various functional blocks may be implemented by the hardware such as an integrated circuit (IC) instead of being implemented by the software.

When implementing various functions by using a plurality of hardware processors, each of the processors may implement one out of the various functions or may implement two or more out of the various functions.

The operation mode of the estimation device 100 (100-2, 100-3) of the first to third embodiments may be in any mode. The estimation device 100 (100-2, 100-3) of the first to third embodiments may be operated as a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation device comprising:
one or more processors configured to:
acquire first point cloud data;
generate, from the first point cloud data, second point cloud data obtained by combining an attention point that gains attention as an estimation target of an attribute and at least one observation point;
estimate an attribute of the attention point by using an attribute indicated by an estimation result label having a higher belonging probability out of belonging probabilities output from an attribute estimation neural network, the attribute estimation neural network including an input layer to which the second point cloud data is input and an output layer that outputs the belonging probabilities for respective attributes of the attention point;
estimate reliability of the estimation result label by using a reliability estimation neural network including an input layer to which an intermediate feature of the attribute estimation neural network is input and an output layer that outputs either logit of an attribute being a correct answer or an estimated value of a belonging probability; and
display, on a display device, first display information generated by performing rendering on an object including an attention point whose attribute is estimated by an attribute of the estimation result label whose reliability is higher than a first threshold, and generated by not performing rendering on an object including an attention point whose attribute is estimated by an attribute of the estimation result label whose reliability is the first threshold or less.

2. The device according to claim 1, wherein the one or more processors are further configured to:
select the attention point from the first point cloud data;
select a predetermined number of the observation points from the first point cloud data in accordance with a predetermined selection probability; and
generate, for each of the observation points, a vector obtained by combining coordinate components of the corresponding observation point and coordinate components of the attention point, and
the second point cloud data is represented by a tensor in which components of the vector are arrayed.

3. The device according to claim 2, wherein the one or more processors are further configured to select the attention point from the first point cloud data based on a uniform distribution.

4. The device according to claim 1, wherein the one or more processors are further configured to:
repeat a generation process of the second point cloud data by a predetermined number of times;
calculate the belonging probability for each of pieces of the second point cloud data generated by the predetermined number of times;
calculate the reliability for each of pieces of the second point cloud data generated by the predetermined number of times; and
calculate integration probability and integration reliability for each of the attributes based on the belonging probability and the reliability calculated for each of pieces of the second point cloud data.

5. The device according to claim 4, wherein
the integration probability is an average of a plurality of belonging probabilities calculated for the pieces of the second point cloud data generated by the predetermined number of times, and
the integration probability is an average of a plurality of reliabilities calculated for the pieces of the second point cloud data generated by the predetermined number of times.

6. The device according to claim 4, wherein
the one or more processors are further configured to decide an attribute having a higher integration probability to be an attribute of the attention point, and decides whether to perform rendering on the object including the attention point based on the integration reliability.

7. The device according to claim 1, wherein the one or more processors are further configured to:
receive selection of a point included in the first display information;
determine a point having reliability in which a difference from reliability of the selected point is smaller than a second threshold; and
update the first display information to second display information generated by not performing rendering on an object including the selected point and an object including the determined point.

8. An estimation method comprising:
acquiring first point cloud data by an estimation device;
generating from the first point cloud data, by the estimation device, second point cloud data obtained by combining an attention point that gains attention as an estimation target of an attribute and at least one observation point;
estimating, by the estimation device, an attribute of the attention point by using an attribute indicated by an estimation result label having a higher belonging probability out of belonging probabilities output from an attribute estimation neural network, the attribute estimation neural network including an input layer into which the second point cloud data is input and an output layer that outputs the belonging probabilities for respective attributes of the attention point;
estimating, by the estimation device, reliability of the estimation result label by using a reliability estimation neural network including an input layer to which an intermediate feature of the attribute estimation neural network is input and an output layer that outputs either logit of an attribute being a correct answer or an estimated value of a belonging probability; and
displaying on a display device, by the estimation device, first display information generated by performing rendering on an object including an attention point whose attribute is estimated by an attribute of the estimation result label whose reliability is higher than a first threshold, and generated by not performing rendering on an object including an attention point whose attribute is estimated by an attribute of the estimation result label whose reliability is the first threshold or less.

9. A computer program product comprising a non-transitory computer-readable medium including programmed instructions, the instructions causing a computer to execute:
acquiring first point cloud data;
generating, from the first point cloud data, second point cloud data obtained by combining an attention point that gains attention as an estimation target of an attribute and at least one observation point;
estimating an attribute of the attention point by using an attribute indicated by an estimation result label having a higher belonging probability out of belonging probabilities output from an attribute estimation neural network, the attribute estimation neural network including an input layer into which the second point cloud data is input and an output layer that outputs the belonging probabilities for respective attributes of the attention point;
estimating reliability of the estimation result label by using a reliability estimation neural network including an input layer to which an intermediate feature of the attribute estimation neural network is input and an output layer that outputs either logit of an attribute being a correct answer or an estimated value of a belonging probability; and
displaying, on a display device, first display information generated by performing rendering on an object including an attention point whose attribute is estimated by an attribute of the estimation result label whose reliability is higher than a first threshold, and generated by not performing rendering on an object including an attention point whose attribute is estimated by an attribute of the estimation result label whose reliability is the first threshold or less.

* * * * *